(12) United States Patent
Sun (10) Patent No.: US 11,844,435 B2
(45) Date of Patent: *Dec. 19, 2023

(54) TELESCOPIC STRUCTURE AND TELESCOPIC STOOL COMPRISING THE SAME

(71) Applicant: Ningbo Tenghao Electronics Co., Ltd., Ningbo (CN)

(72) Inventor: Liang Sun, Ningbo (CN)

(73) Assignee: NINGBO TENGHAO OUTDOOR CO., LTD., Ningbo (CN)

( * ) Notice: Subject to any disclaimer, the term of this patent is extended or adjusted under 35 U.S.C. 154(b) by 155 days.

This patent is subject to a terminal disclaimer.

(21) Appl. No.: 17/316,745

(22) Filed: May 11, 2021

(65) Prior Publication Data

US 2022/0087427 A1 Mar. 24, 2022

Related U.S. Application Data

(63) Continuation-in-part of application No. PCT/CN2021/079353, filed on Mar. 5, 2021.

(30) Foreign Application Priority Data

Sep. 21, 2020 (CN) .......................... 202022080455.2

(51) Int. Cl.
| | |
|---|---|
| A47C 3/40 | (2006.01) |
| A47C 3/20 | (2006.01) |
| A47C 3/16 | (2006.01) |
| A47C 9/10 | (2006.01) |
| B65D 21/08 | (2006.01) |
| A47C 4/52 | (2006.01) |
| E04H 12/18 | (2006.01) |

(Continued)

(52) U.S. Cl.
CPC .................. *A47C 3/40* (2013.01); *A47C 3/16* (2013.01); *A47C 3/20* (2013.01); *A47C 4/52* (2013.01); *B65D 21/086* (2013.01); *E04H 12/182* (2013.01); *F16B 7/10* (2013.01); *F16B 7/105* (2013.01); *A47C 9/00* (2013.01); *A47C 9/10* (2013.01); *H01Q 1/10* (2013.01)

(58) Field of Classification Search
CPC .... A47C 3/40; A47C 3/16; A47C 3/20; A47C 4/52; A47C 9/00; A47C 9/10; E04H 12/182; F16B 7/10; F16B 7/105; H01Q 1/10; B65D 21/086; A47G 2019/2277; A45F 2003/205
USPC ........................................................ 52/118
See application file for complete search history.

(56) References Cited

U.S. PATENT DOCUMENTS 3,715,996 A * 2/1973 Rolfshus .................. A47C 9/00
D6/692.3
8,556,099 B2 * 10/2013 Perlman ............. B65D 11/1873
206/217

(Continued)

*Primary Examiner* — Robert Canfield
(74) *Attorney, Agent, or Firm* — Li & Cai Intellectual Property (USA)

(57) ABSTRACT

The disclosure provides a telescopic structure, including a plurality of connecting pieces connected end to end; two adjacent connecting pieces are movable with respect to each other, and each of the plurality of connecting pieces includes a plurality of fixation mechanisms configured to keep the plurality of connecting pieces in an unfolded state. Also provided is a telescopic stool including a stool surface, a base, and the telescopic structure; the stool surface and the base are connected by the telescopic structure.

11 Claims, 9 Drawing Sheets

(51) Int. Cl.
    *F16B 7/10*     (2006.01)
    *A47C 9/00*     (2006.01)
    *H01Q 1/10*     (2006.01)

(56) References Cited

U.S. PATENT DOCUMENTS

| | | | | |
|---|---|---|---|---|
| D710,650 S | * | 8/2014 | Blum | D7/510 |
| 9,016,491 B2 | * | 4/2015 | Blum | B65D 81/3869 |
| | | | | 220/4.33 |
| D797,908 S | * | 9/2017 | Dam | D23/299 |
| D873,042 S | * | 1/2020 | Dai | D6/335 |
| D878,067 S | * | 3/2020 | You | D6/353 |
| 10,631,646 B1 | * | 4/2020 | Zaifman | A47B 3/002 |
| D891,798 S | * | 8/2020 | Dai | D6/335 |
| D893,204 S | * | 8/2020 | Dai | D6/335 |
| D899,117 S | * | 10/2020 | Dai | D6/351 |
| D918,609 S | * | 5/2021 | Zhao | D6/353 |
| D957,834 S | * | 7/2022 | Sun | D6/353 |
| 2012/0248106 A1 | * | 10/2012 | Marta | B65D 21/086 |
| | | | | 220/8 |
| 2020/0015592 A1 | * | 1/2020 | Zaifman | A47B 3/002 |
| 2020/0408235 A1 | * | 12/2020 | Moody | F16B 7/105 |
| 2022/0061534 A1 | * | 3/2022 | Sun | A47C 7/725 |

* cited by examiner

TELESCOPIC STRUCTURE AND TELESCOPIC STOOL COMPRISING THE SAME

CROSS-REFERENCE TO RELATED APPLICATIONS

This application is a continuation-in-part of International Patent Application No. PCT/CN2021/079353 with an international filing date of Mar. 5, 2021, designating the United States, now pending, and further claims foreign priority benefits to Chinese Patent Application No. 202022080455.2 filed Sep. 21, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a telescopic structure and a telescopic stool comprising the same.

Stools are widely used in people's daily life in various locations, such as bedrooms, offices, laboratories and outdoor places. Conventional stools have a fixed shape and size, and are bulky and not portable.

In recent years, telescopic stools including a telescopic structure have been developed; however, the supporting effect thereof leaves much to be desired.

SUMMARY

The disclosure provides a telescopic structure, comprising a plurality of connecting pieces connected end to end; two adjacent connecting pieces are movable with respect to each other, and each of the plurality of connecting pieces comprises a plurality of fixation mechanisms configured to keep the plurality of connecting pieces in an extended state. After the plurality of connecting pieces are extended, the extended connecting pieces are fixed by the fixation mechanisms, so that the connecting pieces are in the extended state. In this way, a good supporting effect is provided for the extended connecting pieces, thus ensuring the reliability of the telescopic structure when in use.

In a class of this embodiment, each of the plurality of connecting pieces comprises a first movement region configured to allow an adjacent connecting piece to move therein. The first movement region provides a reserved space for the movement of the connecting piece, so that the connecting piece has a sufficient movement range to realize the telescopic operation of the telescopic structure.

In a class of this embodiment, the first movement region is disposed between a first projection and a second projection formed on an inner wall of the connecting piece.

In a class of this embodiment, each of the fixation mechanisms comprises a first limiting structure configured to axially limit the connecting piece. After the plurality of connecting pieces are extended, the axial direction of the connecting pieces is limited by the first limiting structures, and a supporting force is provided for the extended connecting pieces, so that the connecting pieces are effectively fixed at specified positions, the plurality of connecting pieces are matched with each other to provide a stable supporting force, and the reliability of the telescopic structure when in use is ensured.

In a class of this embodiment, the first limiting structure comprises a third projection disposed on the connecting piece and a first bump matched with the third projection on the adjacent connecting piece. After the telescopic structure is extended, the first bump on the connecting piece is located on the third projection on the adjacent connecting piece and provides a supporting force for the connecting piece by the third projection, so that the telescopic structure is kept in the extended state, and the reliability of the telescopic structure when in use is increased. By providing a supporting force for the upper connecting piece by the adjacent connecting piece, the whole telescopic structure becomes more compact, the structural strength of the telescopic structure is increased, and the telescopic structure is firmer when in use.

In a class of this embodiment, each of the fixation mechanisms comprises a second limiting structure configured to circumferentially limit the connecting piece. After the plurality of connecting pieces are extended, the circumferential direction of the connecting pieces is limited by the second limiting structures, so that the connecting pieces cannot be rotated, and it is ensured that the first bump is located on the third projection. Thus, the connecting pieces are effectively fixed at specified positions, the plurality of connecting pieces are matched with each other to provide a stable supporting force, and the reliability of the telescopic structure when in use is ensured.

In a class of this embodiment, the second limiting structure comprises a first slope disposed on the third projection and a second slop disposed on the first bump, and the first slope is fitted with the second slope on the adjacent connecting piece. After the connecting structure is extended, the first bump is located on the top of the third projection, and the second slope is located on the first slope. Under the cooperation of the first slope with the second slope, the center of gravity of the first bump is placed on the bottom end of the first slope, thus preventing the first bump from falling out of the third projection and improving the connecting effect of the first bump and the third projection.

In a class of this embodiment, the second limiting structure further comprises a first connecting portion disposed on the first bump and a second bump matched with the first connecting portion on the adjacent connecting piece. The second bump is matched with the third projection to limit the first bump, thus further improving the matching effect of the first bump and the third projection, preventing the first bump from falling out of the third projection and improving the limiting effect of the third projection to the first bump.

In a class of this embodiment, each of the fixation mechanisms further comprises a third limiting structure configured to radially limit the connecting piece. The third limiting structure is matched with the first limiting structure and the second limiting structure, so that the connecting piece is limited in multiple directions. Thus, the matching stability of the connecting pieces is ensured, the dislocation and collapse of the connecting pieces when in use is avoided, and the stability of the telescopic structure when in use is improved.

In a class of this embodiment, the third limiting structure comprises a third bump disposed on the connecting piece and a surrounding plate matched with the third bump on the adjacent connecting piece. After the connecting piece is extended, the third bump is located on the top of the third projection. By increasing the depth of the third projection by the surrounding plate, the bump is not easy to fall out of the third projection, so that the effect of fixing the first bump is achieved. Due to the surrounding plate, the first bump is limited from multiple angles, and the first bump can only be located on the third projection, so that the matching effect of the first bump and the third projection is improved greatly, and the stability of the telescopic structure when being extended is improved.

In a class of this embodiment, a limiting member that is of a trapezoidal structure is disposed on a sidewall of each of the connecting pieces; a groove matched with the limiting member is disposed on the connecting piece; the groove is disposed on the inner wall of the connecting piece, and the limiting member is disposed longitudinally.

In a class of this embodiment, a second movement region is disposed above the third projection, the first movement region communicates with the second movement region, and the first bump is movable within the first movement region and the second movement region, so that the telescopic structure is switchable between an extended state and a contracted state.

In a class of this embodiment, a limiting member that is of a strip-shaped structure is disposed on a sidewall of each of the connecting pieces, a fourth projection matched with the limiting member is disposed on the connecting piece, the fourth projection is disposed on the inner wall of the connecting piece, and the limiting member is disposed transversely.

In a class of this embodiment, a second connecting portion and a third movement region for guiding the second connecting portion are disposed on each of the connecting pieces; the second connecting portion is of an M-shaped structure; the width of the third movement region is greater than that of the second connecting portion; and, the second connecting portion is circumferentially movable within the third movement region, and has a width that is equal to the length of the third movement region in the circumferential direction of the connecting piece.

In another aspect, a telescopic stool is provided, comprising a stool surface, a base, and the telescopic structure; the stool surface and the base are connected by the telescopic structure.

The following advantages are associated with the telescopic structure and a telescopic stool comprising the same of the disclosure: after a plurality of connecting pieces are extended, the extended connecting pieces are fixed by the fixation mechanisms, so that the connecting pieces are in an extended state. In this way, a good supporting effect is provided for the extended connecting pieces, thus ensuring the reliability of the telescopic structure when in use.

DETAILED DESCRIPTION OF THE PRESENT INVENTION

To further illustrate the disclosure, embodiments detailing a telescopic structure and a telescopic stool comprising the same are described below. It should be noted that the following embodiments are intended to describe and not to limit the disclosure.

Example 1

As shown in FIGS. 1-7, a telescopic structure is provided, comprising a plurality of connecting pieces 3 connected end to end. Each connecting piece is of a ring-shaped structure. The plurality of connecting pieces successively increase in diameter from the top down, and two adjacent connecting pieces 3 are movable with respect to each other. A first movement region 370 for allowing an adjacent connecting piece to move is disposed on each of the connecting pieces, and fixation mechanisms for keeping the plurality of connecting pieces 3 in an extended state are disposed on the connecting pieces 3. The first movement region 370 is disposed between a first projection 320 and a second projection 330 formed on an inner wall of the connecting piece. Each of the fixation mechanisms comprises a first limiting structure configured to axially limit the connecting piece 3 and a second limiting structure configured to circumferentially limit the connecting piece 3. The first limiting structure comprises a third projection 35 disposed on a sidewall of the second projection 330 and a first bump 39 matched with the third projection on the adjacent connecting piece 3. When the first bump 39 is located above the third projection 35 on the adjacent connecting piece and abuts against the third projection 35, the third projection is configured to provide an upward supporting force for the first bump, so that the upper connecting piece is prevented from contracting into the lower connecting piece even if two adjacent connecting pieces are kept in a relatively extended state. A second movement region 32 is disposed above the third projection 35, the first movement region 370 communicates with the second movement region 32, and the first bump is movable within the first movement region and the second movement region, so that it is convenient for the telescopic structure to switch between the extended state and the contracted state.

Further, the second limiting structure comprises a first slope 352 disposed on the third projection 35 and a second slope 392 disposed on the second projection 330. The first slope is high on a side close to the first movement region and low on a side away from the first movement region. The first slope is fitted with the second slope on the adjacent connecting piece 3, so that after the first slope abuts against the second slope due to an external force, the downward external force will apply a circumferential force to the connecting piece under the action of the two slopes. This force allows the first bump on the connecting piece to have a trend of moving away from the first movement region, so that two adjacent connecting pieces can be kept in the extended state and will not be contracted accidently due to twisting. The second limiting structure further comprises a first connecting portion 393 disposed on the first bump and a second bump 353 matched with the first connecting portion on the adjacent connecting piece 3. By matching the second bump with the first connecting portion on the adjacent connecting piece, even if the connecting piece is rotated due to a circumferential force to allow the first bump to move close to the first movement region, the end of the first bump away from the first connecting portion 393 will be blocked by the second bump 353. Thus, it is further ensured that two adjacent connecting pieces can be stably kept in the extended state, and it is safer and more stable in use. In other embodiments, the first connecting portion 393 may not be provided, and the circumferential limiting can be realized only by the matching of the end of the first bump 39 and the second bump 353.

The first bump on the upper connecting piece can be embedded into the first movement region on the lower connecting piece, so that the plurality of connecting pieces are connected end to end. When a telescopic stool is contracted, the first bump of the upper connecting piece is located in the first movement region of the lower connecting piece, and the stool surface is directly pulled upward. After the first bump is moved to the top of the first movement region, by rotating the stool surface, the stool surface drives the connecting piece to rotate, and the first bump is rotated with the connecting piece to reach one end of the second movement region. By pressing down the stool surface, the bottom of the first bump is located on the third projection 35. Under the cooperation of the first slope with the second slope, the center of gravity of the first bump is placed on the bottom end of the first slope, thus preventing the first bump from falling out of the third projection and improving the connecting effect of the first bump and the second movement region. The second bump plays a role of blocking the first bump, so that the first bump is prevented from being pushed out from the third projection when a user sits and twists on the stool surface to drive the stool surface to rotate, the reliability of the telescopic stool when in use is effectively ensured, and the contraction of the telescopic stool when in use is avoided. When it is necessary to contract the telescopic stool, the stool surface is pulled upward, the stool surface drives the connecting pieces to move up, the connecting piece on the top falls out of the third projection on the bottom connecting piece, and the stool surface is rotated, so that it is convenient to rotate the first bump into the first movement region. Then, the stool surface is pushed downward, the stool surface pushes the connecting pieces to move down, and the stool surface directly presses the base, so that it is convenient to contract the telescopic stool.

A limiting member that is of a strip-shaped structure 350 is disposed on a sidewall of each of the connecting pieces, and a fourth projection 3100 matched with the limiting member is disposed on the connecting piece. The fourth projection is disposed on the inner wall of the connecting piece, and the limiting member is disposed transversely to increase the contact area of the limiting member and the fourth projection. A groove 380 matched with the limiting member is disposed on the connecting piece. When the first bump opposes to the first movement region, the groove opposes to the limiting member. After the first bump is moved to the bottom of the first movement region, the limiting member is moved to the bottom of the groove, so that the connecting piece is prevented by the limiting member from falling out of a connecting piece connected thereto during its downward movement, and the reliability of connection between connecting pieces is ensured.

A second connecting portion 340 and a third movement region 390 for guiding the second connecting portion are disposed on each of the connecting pieces. The second connecting portion is of an M-shaped structure. The width of the third movement region is greater than that of the second connecting portion. The second connecting portion is circumferentially movable within the third movement region, so that the second connecting portion is prevented from hindering the rotation of the connecting piece. The width is equal to the length of the third movement region in the circumferential direction of the connecting piece. Since the width of the second connecting portion is greater than that of the first movement region 370, the second connecting portion cannot be placed into the first movement region, so that during assembling, the connecting pieces can be connected only when the second connecting portion is rotated to the third movement region and the first bump 39 is aligned with the first movement region. Thus, the blind connection between connecting pieces is realized, the difficulty of connection between connecting pieces is reduced, the assembly efficiency is improved, and the production efficiency of the stool is improved.

Figure 1:
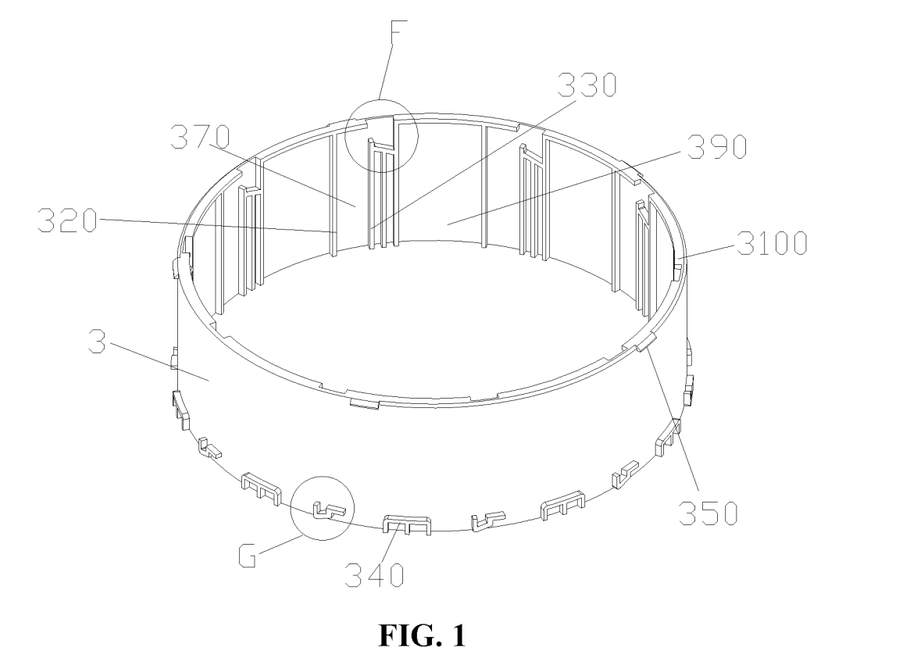
FIG. 1 is a structure diagram of a connecting piece according to Embodiment 1 of the disclosure.
Figure 2:
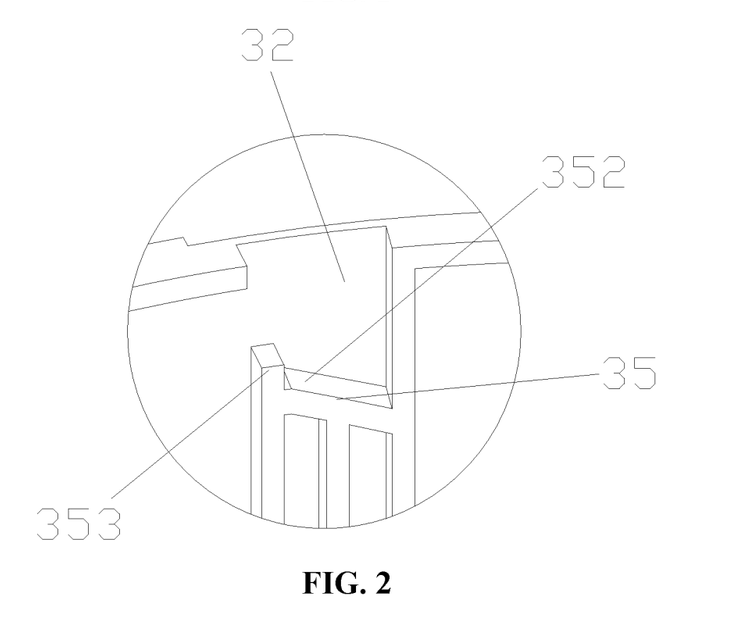
FIG. 2 is an enlarged view of part F in FIG. 1.
Figure 3:
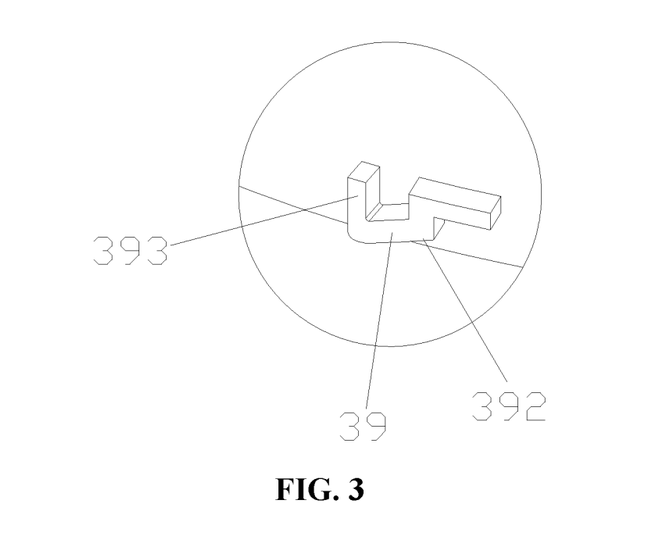
FIG. 3 is an enlarged view of part G in FIG. 1.
Figure 4:
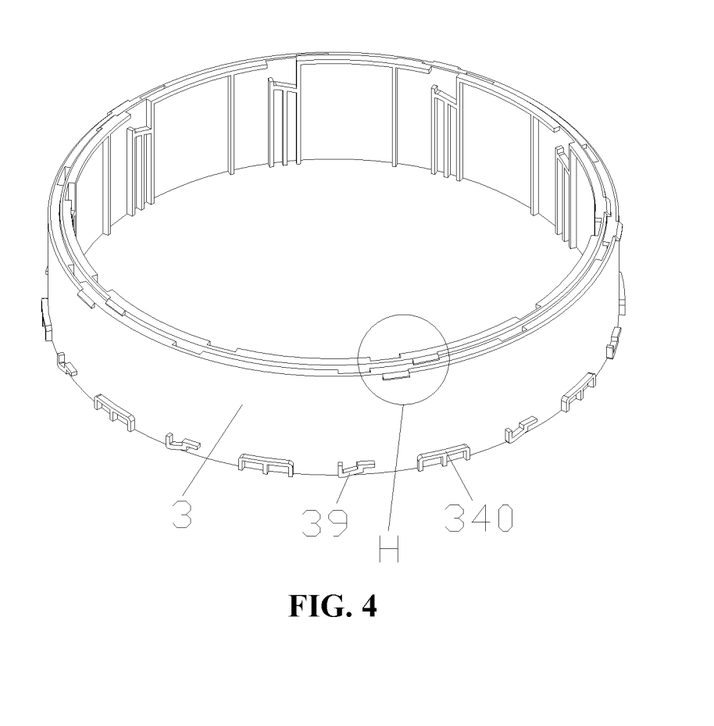
FIG. 4 is a schematic diagram of the matching of two connecting pieces when contracted according to Embodiment 1 of the disclosure.
Figure 5:
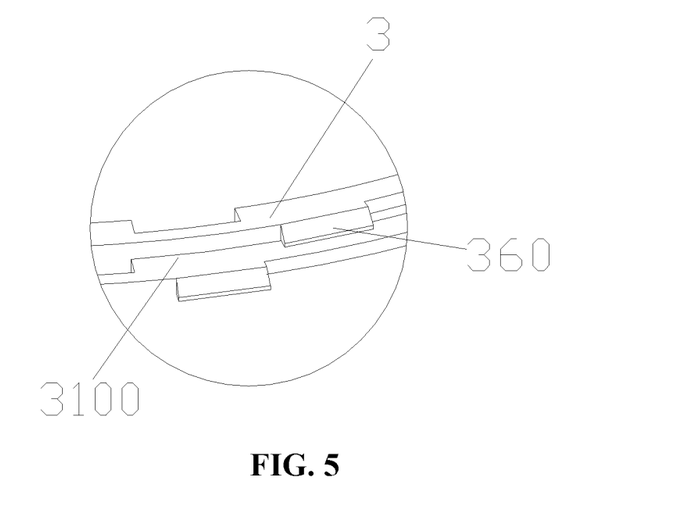
FIG. 5 is an enlarged view of part H in FIG. 4.
Figure 6:
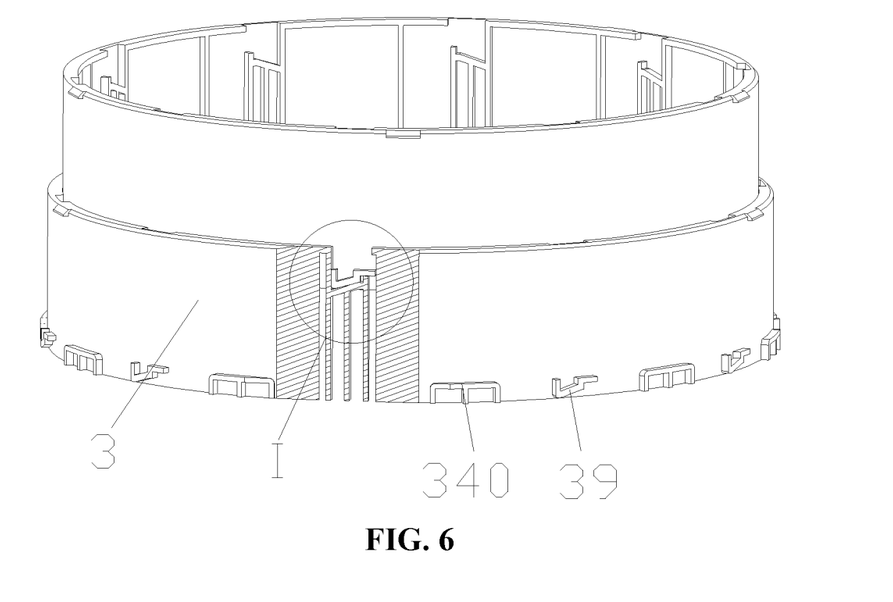
FIG. 6 is a schematic diagram of the matching of two connecting pieces when extended according to Embodiment 1 of the disclosure.
Figure 7:
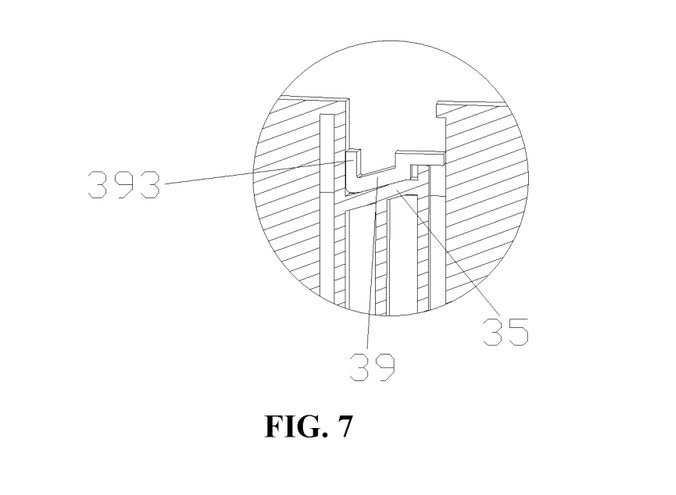
FIG. 7 is an enlarged view of part I in FIG. 6.
Figure 8:
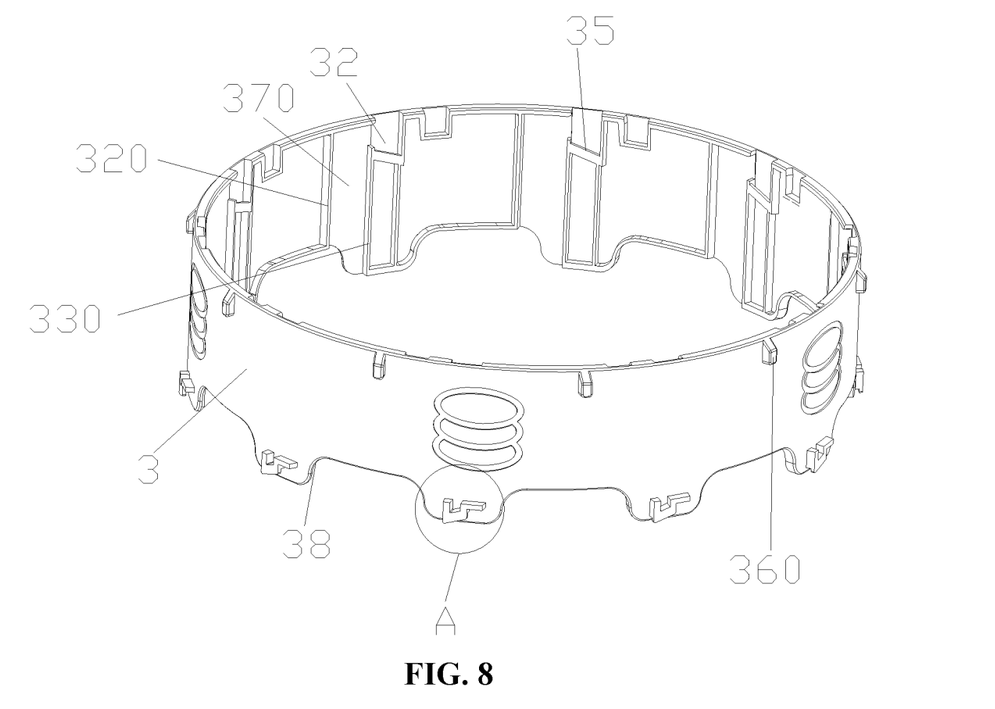
FIG. 8 is a structure diagram of a connecting piece according to Embodiment 2 of the disclosure.
Figure 9:
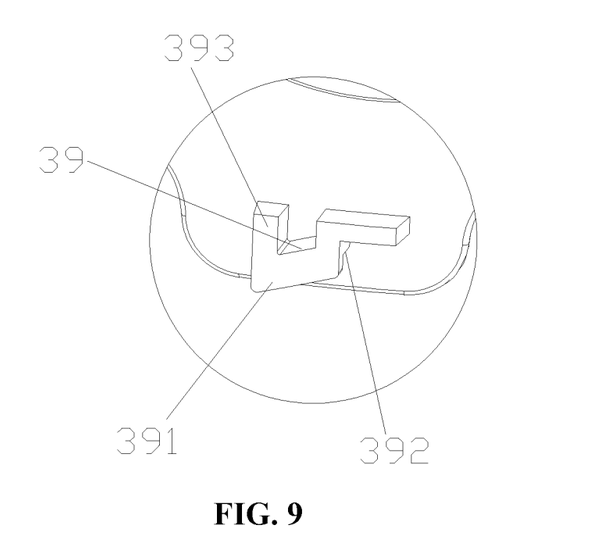
FIG. 9 is an enlarged view of part A in FIG. 8.
Figure 10:
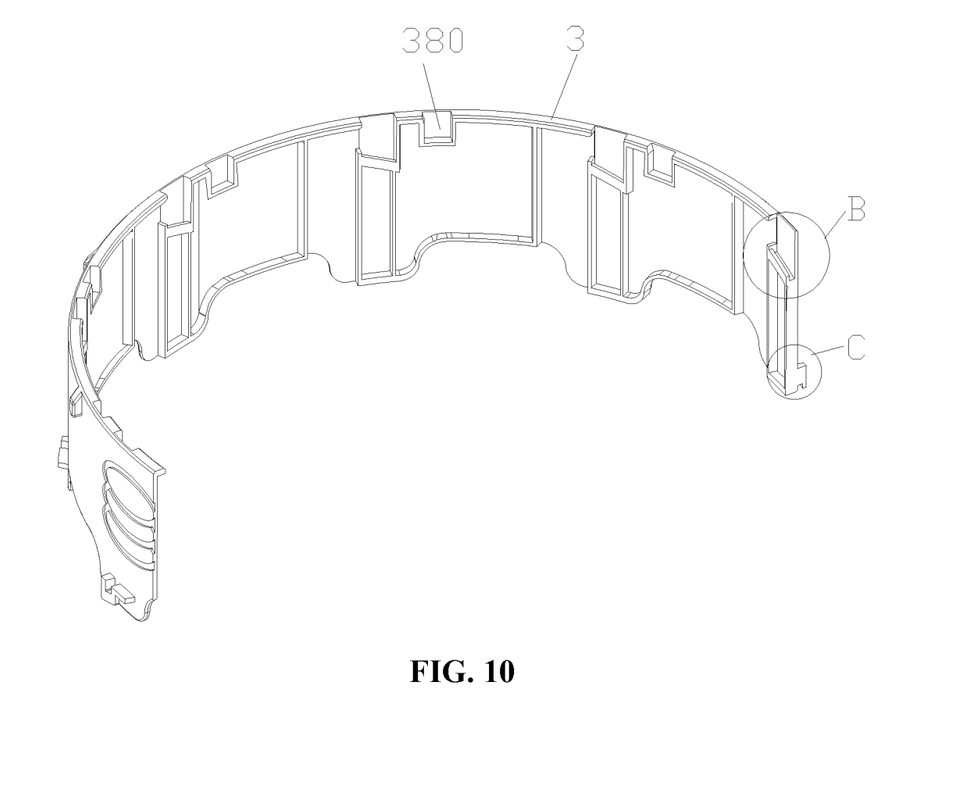
FIG. 10 is a sectional view of the connecting piece according to Embodiment 2 of the disclosure.
Figure 11:
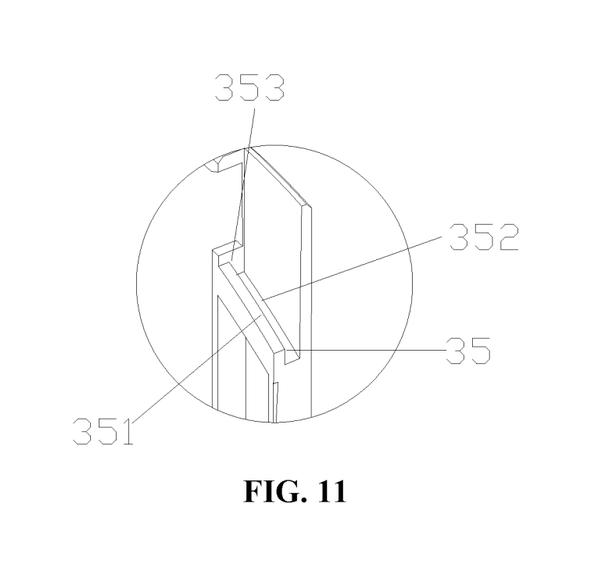
FIG. 11 is an enlarged view of part B in FIG. 10.
Figure 12:
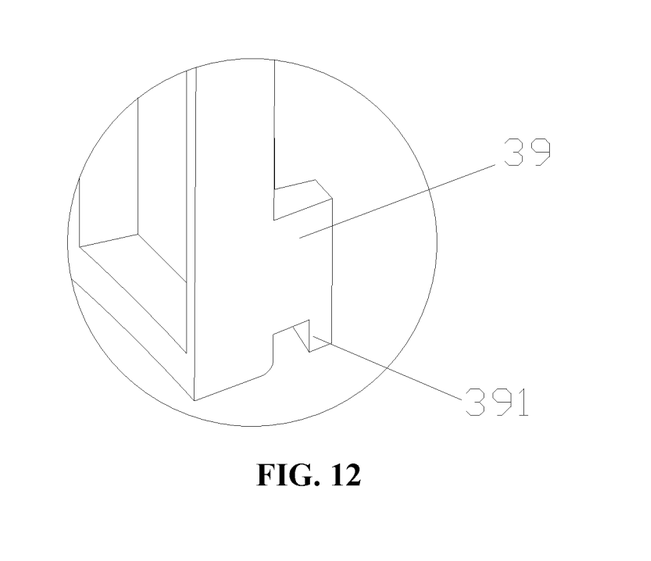
FIG. 12 is an enlarged view of part C in FIG. 10.
Figure 13:
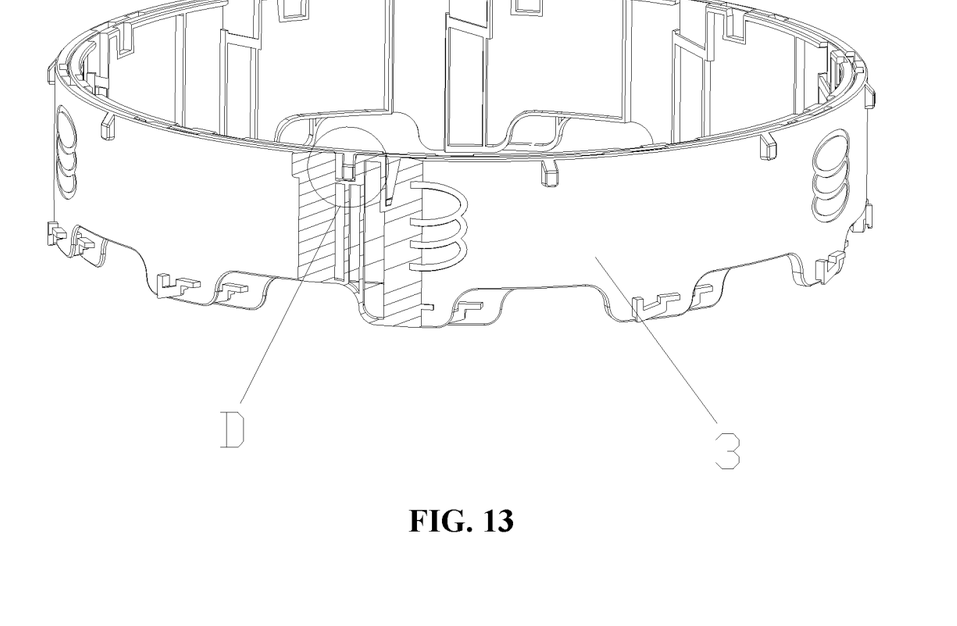
FIG. 13 is a schematic diagram of the matching of two connecting pieces when contracted according to Embodiment 2 of the disclosure.
Figure 14:
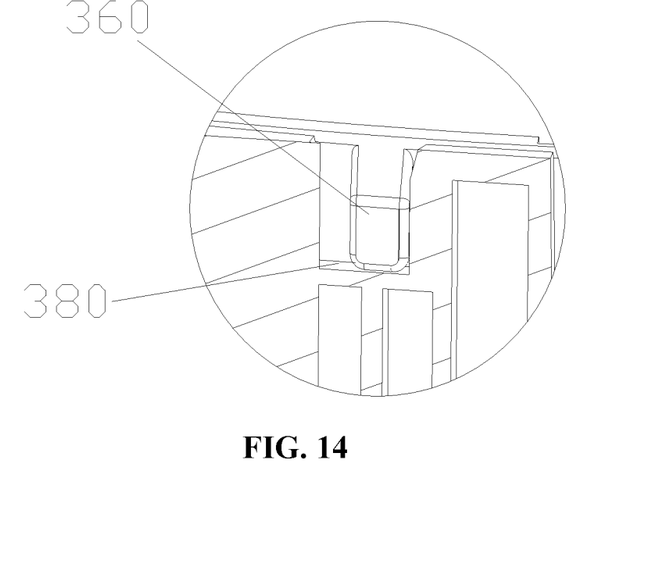
FIG. 14 is an enlarged view of part D in FIG. 13.
Figure 15:
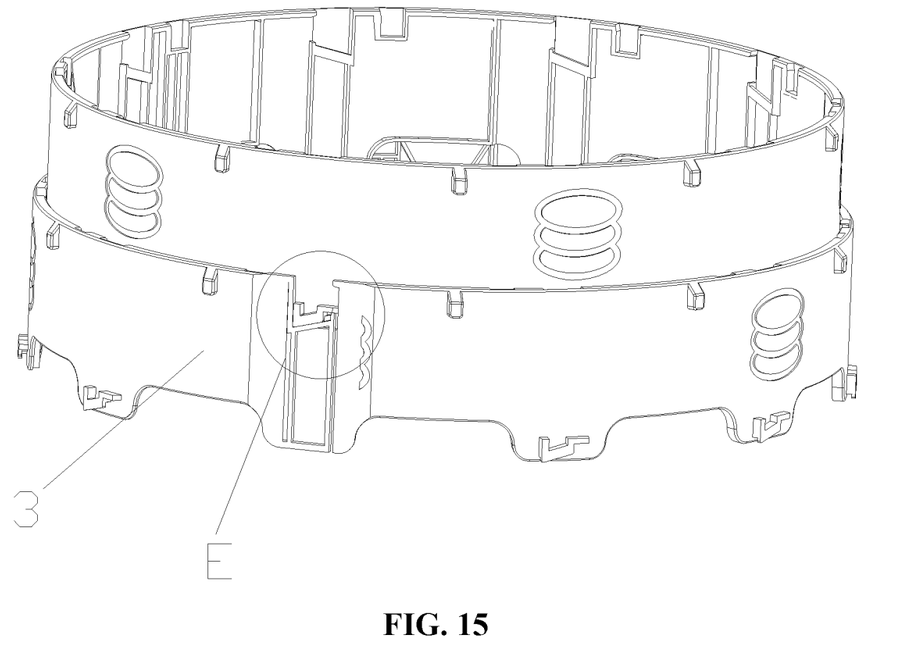
FIG. 15 is a schematic diagram of the matching of two connecting pieces when extended according to Embodiment 2 of the disclosure.
Figure 16:
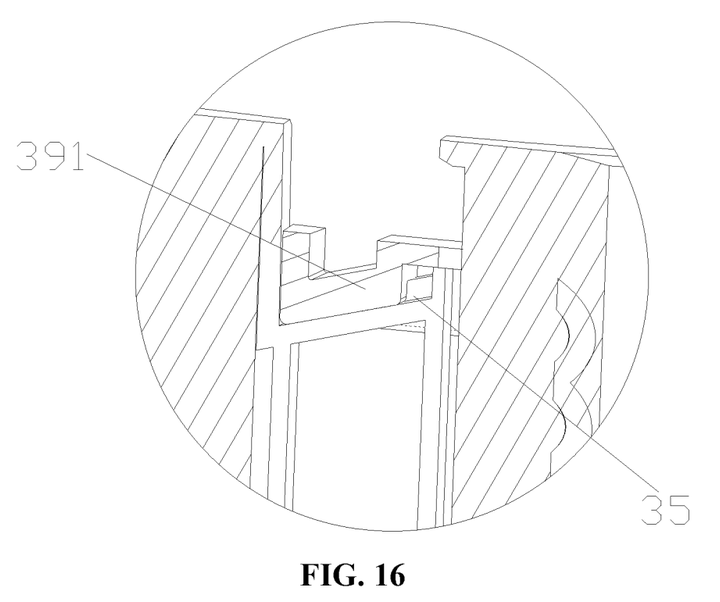
FIG. 16 is an enlarged view of part E in FIG. 15.
Figure 17:
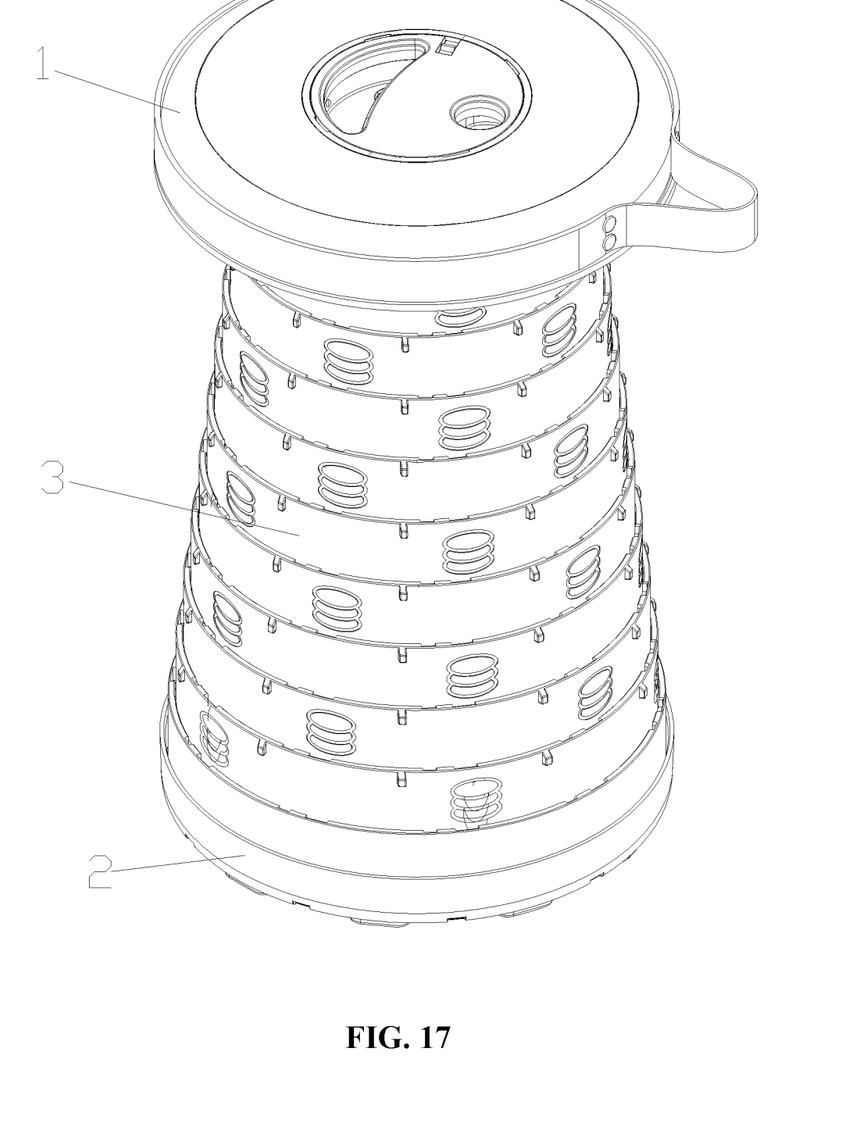
FIG. 17 is a structural diagram of a telescopic stool according to one embodiment of the disclosure.

As shown in FIG. 17, the disclosure also provides a telescopic stool, comprising a stool surface 1, a base 2, and the telescopic structure described above; the stool surface 1 and the base 2 are connected by the telescopic structure.

Example 2

As shown in FIGS. 8-16, this example differs from Example 1 in that: each of the fixation mechanisms further comprises a third limiting structure configured to radially limit the connecting piece 3; the third limiting structure comprises a third bump 391 disposed on the connecting piece and a surrounding plate 351 matched with the third bump on the adjacent connecting piece; the third bump is disposed on the bottom of the first bump 39 and formed by downwardly extending at least one portion of the surface of the outer edge of the first bump; the surrounding plate is disposed on the third projection 35 and formed by upwardly extending at least one portion of the surface of the side of the third projection close to the center of the connecting piece; and, the surrounding plate, the inner wall of the connecting piece and the second bump 353 are matched with each other to form a groove structure on the third projection. The third bump can just be embedded into the groove structure, so that when the telescopic structure is in the extended state, the third bump is just embedded into the groove structure on the adjacent connecting piece. Thus, the connecting piece cannot be deformed radially, two adjacent connecting pieces are stably kept in the extended state, and the structure is more stable and safer.

The third bump on the upper connecting piece is embedded into the first movement region on the lower connecting piece, so that the plurality of connecting pieces are connected end to end. When a telescopic stool is contracted, the first bump of the upper connecting piece is located in the first movement region of the lower connecting piece, and the stool surface is directly pulled upward. After the first bump is moved to the top of the first movement region, by rotating the stool surface, the stool surface drives the connecting piece to rotate, and the first bump is rotated with the connecting piece to reach one end of the second movement region. By pressing down the stool surface, the bottom of the third bump is located in the third projection, and the first bump is connected into the second movement region. The surrounding plate plays a role of blocking the third bump, so that the third bump is prevented from being pushed out from the third projection when a user sits and twists on the stool surface to drive the stool surface to rotate. Meanwhile, by providing the surrounding plate, the third bump is blocked in multiple directions, so that the third bump is prevented from moving out from the sidewall of the third projection after the connecting piece is deformed, the reliability of the telescopic stool when in use is effectively ensured, and the telescopic stool is prevented from contraction when in use. When it is necessary to contract the telescopic stool, the stool surface is pulled upward, the stool surface drives the connecting pieces to move up, the connecting piece on the top falls out of the third projection on the bottom connecting piece, and the stool surface is rotated, so that it is convenient to rotate the first bump into the first movement region. Then, the stool surface is pushed downward, the stool surface pushes the connecting pieces to move down, and the stool surface directly presses the base, so that it is convenient to contract the telescopic stool.

A limiting member 360 that is of a trapezoidal structure is disposed on a sidewall of each of the connecting pieces, and a groove 380 matched with the limiting member is disposed on the connecting piece. The groove is disposed on the inner wall of the connecting piece, and the limiting member is disposed longitudinally. Thus, the thickness of the limiting member in a forced direction is increased, and the supporting effect of the limiting member to the connecting member is improved. Accordingly, the connection effect between two connecting pieces is improved, and the connecting piece on the top is prevented from falling out of the bottom connecting piece when the telescopic stool is contracted. When the first bump opposes the first movement region, the groove opposes the limiting member. After the first bump is moved to the bottom of the first movement region, the limiting member is moved to the bottom of the groove, so that the connecting piece is prevented by the limiting member from falling out of a connecting piece connected thereto during its downward movement, and the reliability of connection between connecting pieces is ensured.

It will be obvious to those skilled in the art that changes and modifications may be made, and therefore, the aim in the appended claims is to cover all such changes and modifications.

What is claimed is:

1. A device, comprising: a plurality of connecting pieces connected end to end; wherein two adjacent connecting pieces are movable with respect to each other, and each of the plurality of connecting pieces comprises a plurality of fixation mechanisms configured to keep the plurality of connecting pieces in an extended state; wherein each of the fixation mechanisms comprises a third limiting structure configured to radially limit a respective connecting piece, and the third limiting structure comprises a third bump disposed on the respective connecting piece and a surrounding plate matched with the third bump on an adjacent one of the connecting pieces with respect to the respective connecting piece; wherein each of the plurality of connecting pieces comprises a first movement region configured to allow an adjacent one of the connecting pieces to move therein, and the first movement region is disposed between a first projection and a second projection formed on an inner wall of the respective connecting piece.

2. The device of claim 1, wherein each of the fixation mechanisms comprises a first limiting structure configured to axially limit the respective connecting piece.

3. The device of claim 2, wherein the first limiting structure comprises a third projection disposed on the respective connecting piece and a first bump matched with the third projection on the adjacent one of the connecting pieces with respective to the respective connecting piece.

4. The device of claim 3, wherein each of the fixation mechanisms comprises a second limiting structure configured to circumferentially limit the respective connecting piece.

5. The device of claim 4, wherein the second limiting structure comprises a first slope disposed on the third projection and a second slope disposed on the first bump, and the first slope is fitted with the second slope on the adjacent one of the connecting pieces.

6. The device of claim 5, wherein the second limiting structure further comprises a first connecting portion disposed on the first bump and a second bump matched with the first connecting portion on the adjacent one of the connecting pieces.

7. The device of claim 6, wherein a limiting member that is of a trapezoidal structure is disposed on a sidewall of the respective connecting piece; a groove matched with the limiting member is disposed on the respective connecting piece; the groove is disposed on the inner wall of the respective connecting piece, and the limiting member is disposed longitudinally.

8. The device of claim 2, wherein a second movement region is disposed above a third projection disposed on the respective connecting piece; the first movement region communicates with the second movement region, and a first bump is movable within the first movement region and the second movement region, so that the device is switchable between an extended state and a contracted state.

9. The device of claim 8, wherein a limiting member that is of a strip-shaped structure is disposed on a sidewall of the respective connecting piece; a fourth projection matched with the limiting member is disposed on the respective connecting piece; the fourth projection is disposed on the inner wall of the respective connecting piece, and the limiting member is disposed transversely.

10. The device of claim 9, wherein a second connecting portion and a third movement region for guiding the second connecting portion are disposed on the respective connecting piece; the second connecting portion is of an M-shaped structure; a width of the third movement region is greater than that of the second connecting portion; and, the second connecting portion is circumferentially movable within the third movement region, and has a width that is equal to a length of the third movement region in a circumferential direction of the respective connecting piece.

11. A telescopic stool, comprising a stool surface, a base, and the device of claim 1 connecting the stool surface and the base.

* * * * *